United States Patent
Xu et al.

(10) Patent No.: US 12,035,321 B2
(45) Date of Patent: Jul. 9, 2024

(54) METHOD AND DEVICE FOR PDCCH MONITORING

(71) Applicant: GUANGDONG OPPO MOBILE TELECOMMUNICATIONS CORP., LTD., Guangdong (CN)

(72) Inventors: Weijie Xu, Guangdong (CN); Jia Shen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 470 days.

(21) Appl. No.: 17/241,944

(22) Filed: Apr. 27, 2021

(65) Prior Publication Data

US 2021/0250922 A1 Aug. 12, 2021

Related U.S. Application Data

(63) Continuation of application No. PCT/CN2018/112922, filed on Oct. 31, 2018.

(51) Int. Cl.
*H04W 72/23* (2023.01)
*H04W 76/27* (2018.01)

(52) U.S. Cl.
CPC .......... *H04W 72/23* (2023.01); *H04W 76/27* (2018.02)

(58) Field of Classification Search
CPC . H04W 72/23; H04W 76/27; H04W 52/0241; H04W 52/0229; H04W 52/0212; H04W 52/0225; H04W 72/0446; H04L 5/001; H04L 5/0026; H04L 5/0053; H04L 5/0082; H04L 5/0091; Y02D 30/70
See application file for complete search history.

(56) References Cited

U.S. PATENT DOCUMENTS

2010/0303011 A1 12/2010 Pan et al.
2014/0161082 A1 6/2014 Gao et al.
(Continued)

FOREIGN PATENT DOCUMENTS

CN 101404526 A 4/2009
CN 104205993 A 12/2014
(Continued)

OTHER PUBLICATIONS

Seisa et al. LTE—The UMTS Long Term Evolution From Theory to Practice, Second Edition, Wiley (Year: 2011).*
(Continued)

*Primary Examiner* — Ayaz R Sheikh
*Assistant Examiner* — David Zhijun Sun
(74) *Attorney, Agent, or Firm* — PERKINS COIE LLP

(57) ABSTRACT

Disclosed are a method and device for PDCCH monitoring capable of reducing power consumption of a terminal device while ensuring satisfaction of the latency requirement of data transmission. The method includes: a terminal device monitoring a PDCCH according to first configuration information, the first configuration information indicating a first PDCCH search space used to monitor the PDCCH; and if the terminal device monitors downlink control information (DCI) at a first monitoring time point in the first PDCCH search space, the terminal device performing additional monitoring of the PDCCH after the first monitoring time point.

15 Claims, 4 Drawing Sheets

200

A terminal device monitors a physical downlink control channel (PDCCH) according to first configuration information indicating a first PDCCH search space for monitoring the PDCCH — 210

The terminal device performs extra PDCCH monitoring after a first monitoring time point if downlink control information (DCI) is detected by the terminal device at the first monitoring time point in the first PDCCH search space — 220

(56) References Cited

U.S. PATENT DOCUMENTS

| | | | |
|---|---|---|---|
| 2017/0318566 A1 | 11/2017 | Deogun et al. | |
| 2019/0305867 A1* | 10/2019 | Tseng | H04L 5/0094 |
| 2021/0235469 A1* | 7/2021 | Mu | H04L 5/0048 |

FOREIGN PATENT DOCUMENTS

| | | | |
|---|---|---|---|
| CN | 108632960 A | 10/2018 | |
| CN | 108633070 A | 10/2018 | |
| EP | 3389329 A1 | 10/2018 | |
| EP | 3606177 A1 | 2/2020 | |
| JP | 2017085569 A | 5/2017 | |
| KR | 20140093261 A | 7/2014 | |
| WO | 2016186016 A1 | 11/2016 | |
| WO | 2018058485 A1 | 4/2018 | |
| WO | 2018171770 A1 | 9/2018 | |
| WO | WO-2018171770 A1 * | 9/2018 | H04L 5/0053 |

OTHER PUBLICATIONS

Examination Report of the European application No. 18938399.5, issued on May 25, 2022. 4 pages.

Notice of Reasons for Refusal for Japanese Application No. 2021-547614 issued Oct. 28, 2022. 15 pages with English translation.

Samsung "Discussion on UE adaptation schemes" R1-1810892; 3GPP TSG RAN WG1 Meeting #94bis; Chengdu, China; Oct. 8-12, 2018. 6 pages.

Second Office Action of the JP application No. 2021-547614, issued on May 19, 2023. 10 pages with English translation.

First Office Action of the CN application No. 202210309761.X, issued on Jun. 1, 2023. 17 pages with English translation.

Intel Corporation, General aspects for NR search space, R1-1702223, 3GPP TSG RAN WG1 Meeting #88 Athens, Greece, Feb. 13-17, 2017. 5 pages.

Second Office Action of the CN application No. 202210309761.X, issued on Aug. 10, 2023. 13 pages with English translation.

Search Report of the EP application No. 23165572.1, issued on Jun. 16, 2023. 8 pages.

Examination Report for Indian Application No. 202127019168 issued Feb. 11, 2022. 6 pages with English translation.

Extended European Search Report for European Application No. 18938399.5 issued Oct. 15, 2021. 8 pages.

International Search Report in the international application No. PCT/CN2018/112922, mailed on Jun. 28, 2019.

First Office Action for Korean Application No. 10-2021-7014091 Issued Sep. 19, 2023, 10 Pages with English Translation.

Third Office Action for Chinese Application No. 202210309761X Issued Nov. 3, 2023, 7 Pages with English Translation.

Decision of Rejection for Japan Application No. 2021-547614 Issued Oct. 24, 2023, 8 Pages with English Translation.

Hearing Notice of the Indian application No. 202127019168, issued on Mar. 4, 2024. 3 pages.

Notice of Allowance of the Korean application No. 10-2021-7014091, issued on Apr. 16, 2024. 3 pages with English translation.

* cited by examiner

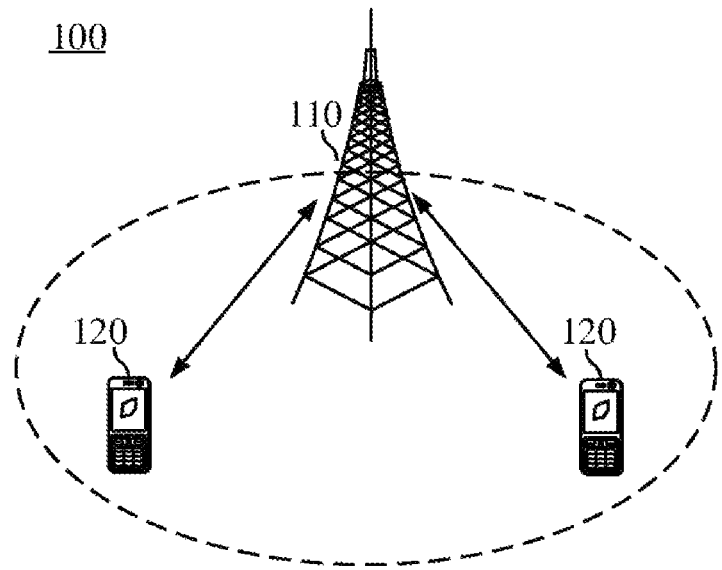

A terminal device monitors a physical downlink control channel (PDCCH) according to first configuration information indicating a first PDCCH search space for monitoring the PDCCH — 210

The terminal device performs extra PDCCH monitoring after a first monitoring time point if downlink control information (DCI) is detected by the terminal device at the first monitoring time point in the first PDCCH search space — 220

FIG. 2

METHOD AND DEVICE FOR PDCCH MONITORING

CROSS-REFERENCE TO RELATED APPLICATION

The present application is a continuation application of International PCT Application No. PCT/CN2018/112922, filed on Oct. 31, 2018, the entire content of which is hereby incorporated by reference.

TECHNICAL FIELD

Implementations of the present disclosure relate to the field of communication, and more particularly, to a method and device for monitoring a Physical Downlink Control Channel (PDCCH).

BACKGROUND

In a 5G system, wireless broadband mobile communication has a higher peak rate, larger transmission bandwidth and lower transmission delay. However, for terminal devices it also brings some problems. For example, broadband radio frequency and extremely fast baseband processing lead to an increase in power consumption of terminal devices compared with previous wireless communication systems, which will affect the standby time and service time of 5G terminal devices, and even affect the battery life of the terminals.

Furthermore, when a terminal device is in a Radio Resource Control (RRC) connection state, a large amount of power consumption is wasted. For example, the terminal needs to periodically monitor the PDCCH based on configuration information of a PDCCH search space in the RRC connected state. However, actually, the network device may only initiate scheduling to the terminal device in a few slots, while for most of the rest of time, it does not initiate scheduling to the terminal device. Thus, if the terminal device still needs to monitor the PDCCH when the PDCCH for the terminal device is not sent, it will lead to unnecessary power consumption.

Such unnecessary power consumption can be reduced by reasonably configuring the PDCCH search space, such as configuring a larger period of the PDCCH search space and a shorter monitoring duration. However, this may cause that the data packet arriving at the terminal device has to go through multiple PDCCH search spaces before being completely transmitted, which introduces a transmission delay.

Therefore, under the condition of reducing the power consumption for a terminal device to perform PDCCH monitoring, how to ensure delay requirement of a service at the same time has become a problem to be solved.

SUMMARY

Implementations of the present disclosure provide a method and a device for monitoring a PDCCH, which can reduce the power consumption of a terminal device and ensure the delay requirement of data transmission at the same time.

In a first aspect, a method for monitoring a PDCCH is provided, which includes: monitoring, by a terminal device, a PDCCH according to first configuration information indicating a first PDCCH search space for monitoring the PDCCH; and performing, by the terminal device, extra PDCCH monitoring after a first monitoring time point if downlink control information (DCI) is detected by the terminal device at the first monitoring time point in the first PDCCH search space.

In a second aspect, a method for monitoring PDCCH is provided, which includes: sending, by a network device, second configuration information to a terminal device, wherein the second configuration information indicates a second PDCCH search space for performing extra PDCCH monitoring, wherein the extra PDCCH monitoring is performed by the terminal device after a first monitoring time point, and the first monitoring time point is a time point when downlink control information (DCI) is detected by the terminal device in a first PDCCH search space.

In a third aspect, a terminal device is provided, which may perform the method in the first aspect or any optional implementation of the first aspect. Specifically, the terminal device may include functional modules for performing the method in the first aspect or any possible implementation of the first aspect.

In a fourth aspect, a network device is provided, which may perform the method in the second aspect or any optional implementation of the second aspect. Specifically, the network device may include functional modules for performing the method in the second aspect or any possible implementation of the second aspect.

In a fifth aspect, a terminal device is provided, which includes a processor and a memory. The memory is configured to store a computer program, and the processor is configured to call and run the computer program stored in the memory to perform the method in the first aspect or any possible implementation of the first aspect.

In a sixth aspect, a network device is provided, which includes a processor and a memory. The memory is configured to store a computer program, and the processor is configured to call and run the computer program stored in the memory to perform the method in the second aspect or any possible implementation of the second aspect.

In a seventh aspect, a chip is provided, which is configured to perform the method in the first aspect or any possible implementation of the first aspect. Specifically, the chip includes a processor configured to call and run a computer program from a memory to enable a device on which the chip is installed to perform the method in the first aspect or any possible implementation of the first aspect.

In an eighth aspect, a chip is provided, which is configured to perform the method in the second aspect or any possible implementation of the second aspect. Specifically, the chip includes a processor configured to call and run a computer program from a memory to enable the device the device on which the chip is installed to perform the method in the second aspect or any possible implementation of the second aspect.

In a ninth aspect, a computer readable storage medium is provided for storing a computer program that enables a computer to perform the method in the first aspect or any possible implementation of the first aspect.

In a tenth aspect, a computer readable storage medium is provided for storing a computer program that enables a computer to perform the method in the second aspect or any possible implementation of the second aspect.

In an eleventh aspect, a computer program product is provided, which includes computer program instructions that enable a computer to perform the method in the first aspect or any possible implementation of the first aspect.

In a twelfth aspect, a computer program product is provided, which includes computer program instructions that enable a computer to perform the method in the second aspect or any possible implementation of the second aspect.

In a thirteenth aspect, a computer program is provided, which, when running on a computer, enables a computer to perform the method in the first aspect or any possible implementation of the first aspect.

In a fourteenth aspect, a computer program is provided, which, when running on a computer, enables a computer to perform the method in the second aspect or any possible implementation of the second aspect.

In a fifteenth aspect, a communication system is provided, which includes a terminal device and a network device.

The terminal device is configured to monitor a PDCCH according to first configuration information indicating a first PDCCH search space for monitoring the PDCCH, and perform extra PDCCH monitoring after a first monitoring time point if DCI is detected at the first monitoring time point in the first PDCCH search space.

The network device is configured to send second configuration information to the terminal device, wherein the second configuration information indicates a second PDCCH search space for performing the extra PDCCH monitoring, wherein the extra PDCCH monitoring is performed by the terminal device after a first monitoring time point, and the first monitoring time point is a time point when DCI is detected by the terminal device in a first PDCCH search space.

With the above technical solutions, the terminal device can perform PDCCH monitoring in the first PDCCH search space, and perform extra PDCCH monitoring in the second PDCCH search space after the time point when the DCI is detected. In this way, the power consumption of the terminal device can be reduced by configuring the first PDCCH search space, and more transmission opportunities can be provided by the second PDCCH search space, to realize timely and rapid scheduling of data packets under the condition of reducing power consumption, thereby ensuring the delay requirement of data transmission.

BRIEF DESCRIPTION OF DRAWINGS

FIG. 1 is a schematic diagram of a possible wireless communication system applied by an implementation of the present disclosure.

FIG. 2 is a schematic flow chart of a method for monitoring a PDCCH according to an implementation of the present disclosure.

DETAILED DESCRIPTION

Figure 3:
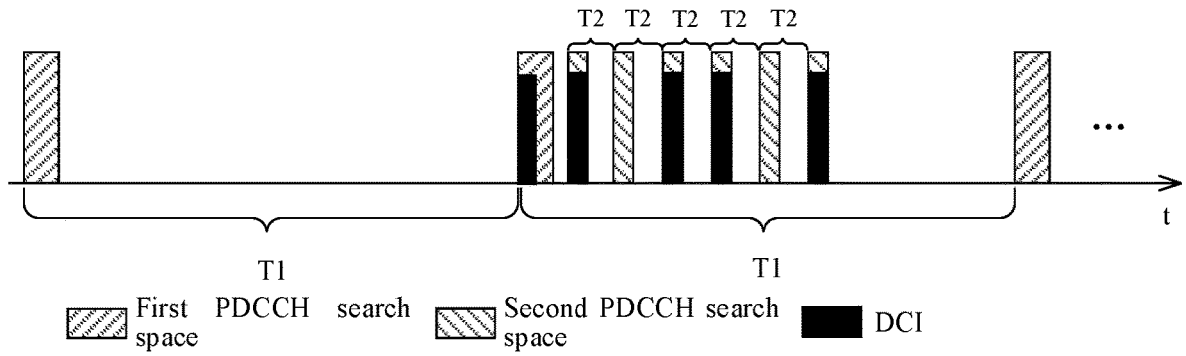
FIG. 3 is a schematic diagram of a PDCCH search space according to an implementation of the present disclosure.

Technical solutions in implementations of the present disclosure will be described below with reference to the drawings in the implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

The technical solutions of implementations of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, an Advanced Long Term Evolution (LTE-A) system, a New Radio (NR) system, an evolution system of the NR system, LTE-based access to unlicensed spectrum (LTE-U) system, an NR-based access to unlicensed spectrum (NR-U) system, a Universal Mobile Telecommunications System (UMTS), a Worldwide Interoperability for Microwave Access (WiMAX) communication system, a Wireless Local Area Network (WLAN), a Wireless Fidelity (WiFi), a next generation communication system or other communication systems.

Generally speaking, a traditional communication system supports a limited number of connections and is easy to implement. However, with development of communication technology, the mobile communication system will not only support traditional communication, but also support, for example, Device to Device (D2D) communication, Machine to Machine (M2M) communication, Machine Type Communication (MTC), Vehicle to Vehicle (V2V) communication, etc., and the implementations of the present disclosure may also be applied to these communication systems.

Optionally, the communication system in the implementations of the present disclosure may be applied to a Carrier Aggregation (CA) scenario, a Dual Connectivity (DC) scenario, or a Standalone (SA) network deployment scenario.

Illustratively, a communication system 100 applied in an implementation of the present disclosure is shown in FIG. 1. The wireless communication system 100 may include a network device 110. The network device 110 may be a device that communicates with a terminal device. The network device 110 may provide communication coverage for a specific geographical area, and may communicate with terminal devices located within the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a network side device in an NR system, or a radio controller in a Cloud Radio Access Network (CRAN). Or the network device may be a relay station, an access point, a vehicle-mounted device, a wearable device, a network side device in the next generation network, or a network device in a future evolved Public Land Mobile Network (PLMN), etc.

The wireless communication system 100 further includes at least one terminal device 120 within the coverage area of the network device 110. As used herein, the term "terminal device" includes, but is not limited to, a device configured to connect via a wired circuit, for example, a Public Switched Telephone Network (PSTN), a Digital Subscriber Line (DSL), a digital cable, a direct cable; and/or another data connection/network, and/or via a wireless interface, for instance, for a cellular network, a Wireless Local Area Network (WLAN), a digital television network such as a DVB-H network, a satellite network, and an AM-FM broadcast transmitter; and/or an apparatus, of another terminal device, configured to receive/send a communication signal; and/or an Internet of Things (IoT) device. A terminal device configured to communicate via a wireless interface may be referred to as a "wireless communication terminal", a "wireless terminal" or a "mobile terminal".

The terminal device 120 may be mobile or fixed. Optionally, the terminal device 120 may be referred to as an access terminal, User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like. Optionally, terminal direct connection (Device to Device, D2D) communication may be performed between the terminal devices 120.

Specifically, the network device 110 may provide services for a cell, and the terminal device 120 communicates with the network device 110 through transmission resources (e.g., frequency domain resources or spectrum resources) used by the cell. The cell may be a cell corresponding to the network device 110 (e.g., a base station), which may belong to a macro base station, or may belong to a base station corresponding to a Small cell. The small cell may include: a Metro cell, a Micro cell, a Pico cell, and a Femto cell, etc. The small cells have characteristics of small coverage and low transmission power, and they are suitable for providing high-speed data transmission services.

FIG. 1 shows one network device and two terminal devices as an example. Optionally, the wireless communication system 100 may include multiple network devices, and other quantity of terminal devices may be included within the coverage area of each network device, which is not limited in the implementations of the present disclosure. In addition, the wireless communication system 100 may, for example, further include other network entities such as a network controller, a mobile management entity, which is not limited in the implementations of the present disclosure.

A terminal device needs to periodically monitor a physical downlink control channel (PDCCH) based on configuration information of a PDCCH search space in a RRC connection state. However, actually, a network device may only initiate scheduling to the terminal device in a few slots, while for most of the rest of time, the network device does not initiate scheduling to the terminal device. Thus, the terminal device still needs to monitor the PDCCH even if the PDCCH for the terminal device is not sent, which leads to unnecessary power consumption.

To reduce this unnecessary power consumption, a PDCCH search space may be reasonably configured to reduce the power consumption of the terminal device, for example, configuring a larger period of the PDCCH search space and a shorter monitoring duration, which will be called the configuration of the PDCCH search space based on energy saving hereinafter. However, service arrival of the terminal device is uneven in time distribution. Sometimes no data arrives for a period of time, and sometimes a packet that arrives needs to be continuously transmitted for a period of time before it can be transmitted completely. Therefore, overly conservative configuration of the PDCCH search space may cause that the data packet arriving at the terminal device has to go through multiple PDCCH search spaces before being completely transmitted, which introduces a transmission delay. This also means that through the configuration of the PDCCH search space, it is difficult not only to realize energy saving but also to ensure relative timely transmission of service packets arrived at the terminal device.

Therefore, the implementations of the present disclosure propose that the terminal device may perform PDCCH monitoring in the first PDCCH search space, and perform extra PDCCH monitoring in the second PDCCH search space after the time point when DCI is detected. In this way, the power consumption of the terminal device can be reduced by configuring the first PDCCH search space, and more transmission opportunities can be provided by the second PDCCH search space, to realize timely and rapid scheduling of data packets under the condition of reducing power consumption, thereby ensuring the delay requirement of data transmission.

FIG. 2 is a schematic flow chart of a method 200 for monitoring a PDCCH according to an implementation of the present disclosure. The method shown in FIG. 2 may be performed by a terminal device. The terminal device may be, for example, the terminal device 120 shown in FIG. 1. As shown in FIG. 2, the method 200 for monitoring the PDCCH may include some or all of the following acts.

In 210, a terminal device monitors a physical downlink control channel (PDCCH) according to first configuration information indicating a first PDCCH search space for monitoring the PDCCH.

In 220, the terminal device performs extra PDCCH monitoring after a first monitoring time point if downlink control information (DCI) is detected by the terminal device at the first monitoring time point in the first PDCCH search space.

The first configuration information, for example, may be notified to the terminal device by a network device through radio resource control (RRC) signaling. Optionally, the first configuration information may include at least one of following pieces of information: an identity of configuration of the first PDCCH search space (search space ID); an identity of configuration of a Control Resource Set (CORESET) in the first PDCCH search space; a period of a monitoring slot and an offset in the period of the first PDCCH search space, wherein a supportable period in the NR currently includes 1, 2, 4, 5, 8, 10, 16, 20, 40, 80, 160, 320, 640, 1280 or 2560 slots; information of symbols for monitoring within a monitoring slot (monitoring Symbols Within Slot), such as a position of a start monitoring symbol within the monitoring slot; a monitoring duration in the first PDCCH search space (Duration), such as the number of consecutive slots for monitoring; information of PDCCH candidates in the first PDCCH search space (PDCCH candidates); a type of the first PDCCH search space, that is, whether the first PDCCH search space is a common search space or a terminal device-specific search space (UE-specific space); an aggregation level of the first PDCCH search space, etc.

The terminal device may determine a first PDCCH search space according to the first configuration information, and perform PDCCH monitoring (or listening, detecting, sensing, etc.) in the first PDCCH search space. The first PDCCH search space may be configured for saving power consumption, for example, configuring a larger period of a monitoring slot of the PDCCH search space, a shorter monitoring duration, a smaller number of monitoring time points, etc., to reduce the frequency for the terminal device to monitor the PDCCH, thereby saving power consumption of the terminal device.

However, once a data packet arrives in the first PDCCH search space indicated by the first configuration information, such configuration may cause that the data packet goes through multiple PDCCH search spaces before being completely transmitted, which introduces a transmission delay.

Therefore, when the Download Control Information (DCI) is detected by the terminal device in the first PDCCH search space, the terminal device may perform extra PDCCH monitoring after a first monitoring time point when the DCI is detected, thereby ensuring that data scheduled by the DCI can be transmitted in time.

Optionally, in 220, performing, by the terminal device, extra PDCCH monitoring after the first monitoring time point, includes: after the first monitoring time point, the terminal device performs the extra PDCCH monitoring according to second configuration information indicating a second PDCCH search space for performing the extra PDCCH monitoring.

The terminal device may receive the second configuration information sent by the network device, for example, the network device sends the second configuration information to the terminal device through RRC signaling, a Media Access Control (MAC) Control Element (CE) or a broadcast message, etc.; or, the terminal device obtains the second configuration information pre-stored in the terminal device, that is, the second configuration information is agreed by a protocol.

Optionally, the second configuration information may include at least one of following pieces of information: an identity of configuration of the second PDCCH search space (search space ID); an identity of configuration of a CORE-SET in the second PDCCH search space (control Resource Set Id); a period of a monitoring slot and an offset in the period of the second PDCCH search space, for example, a supportable period includes 1, 2, 4, 5, 8, 10, 16, 20, 40, 80, 160, 320, 640, 1280 or 2560 slots; information of symbols for monitoring within a monitoring slot (monitoring Symbols Within Slot), such as a position of a start monitoring symbol in the monitoring slot; a monitoring duration in the second PDCCH search space (Duration), such as the number of consecutive slots for monitoring; information of PDCCH candidates in the second PDCCH search space (PDCCH candidates); a type of the second PDCCH search space, that is, whether the second PDCCH search space is a common search space or a terminal device-specific search space (UE-specific space); an aggregation level of the second PDCCH search space, etc.

The values of at least some parameters in the second configuration information are different from those in the first configuration information, and the second configuration information should make the frequency at which the terminal device performs PDCCH monitoring in the second PDCCH search space higher than that in the first PDCCH search space, so that arrived data packets can be scheduled and transmitted in time. In other words, a distribution density of the second PDCCH search space in the time domain is greater than that of the first PDCCH search space in the time domain.

Optionally, a period of a monitoring slot of the first PDCCH search space is larger than that of the second PDCCH search space; and/or, the number of PDCCH candidates in the first PDCCH search space is less than that in the second PDCCH search space; and/or, the number of PDCCH aggregation levels in the first PDCCH search space is less than the number of candidate PDCCH aggregation levels in the second PDCCH search space; and/or, a monitoring duration in the first PDCCH search space is less than that in the second PDCCH search space; and/or, the number of start symbols for monitoring in a monitoring slot in the first PDCCH search space is less than that in the second PDCCH search space.

For example, as shown in FIG. 3, a period of a monitoring slot of the first PDCCH search space is T1, and a period of a monitoring slot of the second PDCCH search space is T2, where T2<T1. The terminal device performs extra PDCCH monitoring in the second PDCCH search space after DCI is detected by the terminal device in the first PDCCH search space. It can be seen that the frequency at which PDCCH monitoring is performed in the second PDCCH search space is significantly higher than that in the first PDCCH search space. Therefore, the extra PDCCH monitoring is performed after the DCI is detected, which can achieve that the data scheduled by the DCI can be transmitted in time. Before the DCI is not detected, the terminal device monitors the PDCCH in the first PDCCH search space, thereby reducing its power consumption.

In another example, the PDCCH aggregation level in the first PDCCH search space only includes aggregation level 1, while the PDCCH aggregation levels in the second PDCCH search space include aggregation levels 1, 2, 4, etc.

For another example, the number of start symbols for monitoring in the monitoring slot in the second PDCCH search space is 2, they are assumed to be symbol 0 and symbol 7 in the monitoring slot. While the number of start symbols for monitoring in the monitoring slot in the first PDCCH search space is 1, and it is assumed that PDCCH monitoring is started only on symbol 0.

In another example, the number of consecutive slots for monitoring in the first PDCCH search space is 1, and the number of consecutive slots for monitoring in the second PDCCH search space is 2.

Optionally, in 220, performing, by the terminal device, extra PDCCH monitoring after the first monitoring time point, includes that the terminal device performs the extra PDCCH monitoring after the first monitoring time point according to a first timer.

Or, optionally, the method further includes: the terminal device receives indication information sent by the network device, wherein the indication information is used for indicating the terminal device to stop the extra PDCCH monitoring. In 220, performing, by the terminal device, extra PDCCH monitoring after the first monitoring time point, includes that the terminal device performs the extra PDCCH monitoring after the first time point, and when receiving the indication information, stops the extra PDCCH monitoring.

That is to say, the terminal device may perform the extra PDCCH monitoring based on the first timer, or may perform the extra PDCCH monitoring according to an indication of the network device, and the indication information may be sent to the terminal device through DCI, for example.

For example, the terminal device may restart the first timer at the first monitoring time point; and/or, the terminal device restarts the first timer every time DCI is detected; and/or, the terminal device continues to run the first timer to enable the first timer to continue running or add 1 to the number of times, recorded by the terminal device, that DCI is not detected if DCI is not detected; and/or, the terminal device stops performing the extra PDCCH monitoring when the first timer expires or the number of times, recorded by the terminal device, that DCI is not detected exceeds a threshold.

Taking FIG. 3 as an example, when DCI is detected by the terminal device at the first monitoring time point, the terminal device starts the first timer and performs extra PDCCH monitoring in the second PDCCH search space indicated by the second configuration information. If DCI is detected by the terminal device at a certain monitoring time point in the second PDCCH search space, the terminal device will restart the first timer, and the terminal device needs to restart the first timer every time DCI is detected afterwards. When DCI is not detected by the terminal device, the terminal device keeps the first timer running continuously. For example, if DCI is not detected at the current monitoring time point, the first timer continues running (for example, GPS time), or the first timer adds 1 to the number of times, recorded by the terminal device, that DCI is not detected. Accordingly, when the first timer expires or the number of times, recorded by the terminal device, that DCI is not detected exceeds a threshold, the terminal device stops performing the extra PDCCH monitoring in the second PDCCH search space, and then may continue to perform PDCCH monitoring in the first PDCCH search space, and the first timer is not started until DCI is detected again.

The terminal device may receive configuration information of the first timer sent by the network device, such as a timing duration of the first timer, and the network device may send the configuration information of the first timer to the terminal device through, for example, RRC signaling, a MAC CE, a broadcast message, etc.; or, the terminal device obtains the configuration information of the first timer pre-stored in the terminal device, that is, the configuration information of the first timer is agreed by a protocol.

Figure 4:
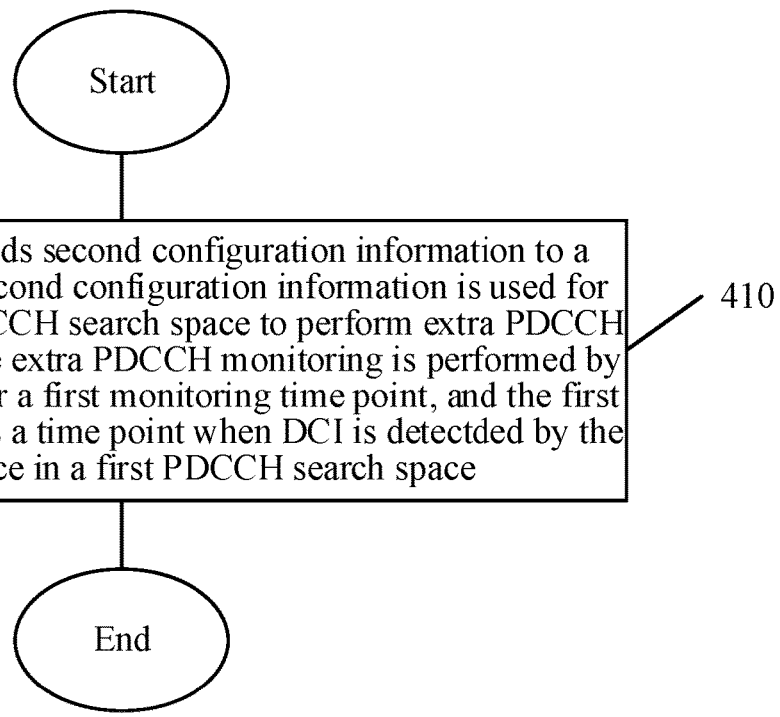
FIG. 4 is a schematic flow chart of a method for monitoring a PDCCH according to an implementation of the present disclosure.

FIG. 4 is a schematic flow chart of a method 400 for monitoring a PDCCH according to an implementation of the present disclosure. The method shown in FIG. 4 may be performed by a network device. The network device may be, for example, the network device 110 shown in FIG. 1. As shown in FIG. 4, the method 400 for monitoring the PDCCH may include some or all of the following acts.

In 410, a network device sends second configuration information to a terminal device, wherein the second configuration information indicates a second PDCCH search space for the terminal device to perform extra PDCCH monitoring, wherein the extra PDCCH monitoring is performed by the terminal device after a first monitoring time point, and the first monitoring time point is a time point when DCI is detected by the terminal device in a first PDCCH search space.

The terminal device may determine the first PDCCH search space according to the first configuration information, and perform the PDCCH monitoring in the first PDCCH search space. The first configuration information may be designed for saving power consumption, for example, configuring a larger period of a monitoring slot of the PDCCH search space, a shorter monitoring duration, a smaller number of monitoring time points, etc., to reduce the frequency for the terminal device to monitor PDCCH, thereby saving power consumption of the terminal device.

However, once a data packet arrives in the first PDCCH search space indicated by the first configuration information, such design may cause that the data packet goes through multiple PDCCH search spaces before being completely transmitted, which introduces a transmission delay.

In this implementation, the terminal device may perform PDCCH monitoring in the first PDCCH search space, and perform extra PDCCH monitoring in the second PDCCH search space after a time point when DCI is detected. Therefore, the power consumption of the terminal device can be reduced by configuring the first PDCCH search space, and more transmission opportunities can be provided by the second PDCCH search space, to realize timely and rapid scheduling of data packets under the condition of reducing power consumption, thereby ensuring the delay requirement of data transmission.

Optionally, sending, by the network device, second configuration information to the terminal device, includes that the network device sends RRC signaling or a MAC CE carrying the second configuration information to the terminal device.

Optionally, the second configuration information includes at least one of following pieces of information: an identity (ID) of configuration of the second PDCCH search space, an ID of configuration of a control resource set (CORESET) in the second PDCCH search space, a period of a monitoring slot and an offset in the period of the second PDCCH search space, information of symbols for monitoring in a monitoring slot, a monitoring duration in the second PDCCH search space, information of PDCCH candidates in the second PDCCH search space; information indicating whether the second PDCCH search space is a common search space or a terminal device-specific search space.

Optionally, a period of a monitoring slot of the first PDCCH search space is larger than that of the second PDCCH search space; and/or the number of PDCCH candidates in the first PDCCH search space is less than that in the second PDCCH search space; and/or the number of PDCCH aggregation levels of the first PDCCH search space is less than the number of candidate PDCCH aggregation levels of the second PDCCH search space; and/or, a monitoring duration in the first PDCCH search space is less than that in the second PDCCH search space; and/or, the number of start symbols for monitoring in a monitoring slot in the first PDCCH search space is less than that in the second PDCCH search space.

Optionally, the method further includes: the network device sends configuration information of a first timer to the terminal device, wherein the first timer is used for the terminal device to perform the extra PDCCH monitoring after the first monitoring time point.

Optionally, sending, by the network device, configuration information of the first timer to the terminal device, includes that the network device sends RRC signaling or a MAC CE carrying the configuration information of the first timer to the terminal device.

Optionally, the method further includes: he network device sends indication information to the terminal device, wherein the indication information is used for indicating the terminal device to stop the extra PDCCH monitoring.

Optionally, sending, by the network device, indication information to the terminal device, includes that the network device sends DCI carrying the indication information to the terminal device.

Optionally, the method further includes: the network device sends first configuration information to the terminal device, wherein the first configuration information indicates a first PDCCH search space for monitoring PDCCH.

Optionally, sending, by the network device, first configuration information to the terminal device, includes that the network device sends RRC signaling carrying the first configuration information to the terminal device.

It should be understood that a process of indicating the terminal device to perform extra PDCCH monitoring in the second PDCCH search space through the second configuration information by the network device, may be referred to the related description for the terminal device in the aforementioned FIG. 2, which will not be described repeatedly here for brevity.

It should be noted that, on the premise of no conflict, various implementations described in the present disclosure and/or the technical features in various implementations can be arbitrarily combined with each other, and the technical solutions obtained after combination should also fall into the protection scope of the present disclosure.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

The communication method according to the implementations of the present disclosure have been described in detail above, and the device according to the implementations of the present disclosure will be described below with reference to FIG. 5 to FIG. 9. The technical features described in the method implementations are applicable to following device implementations.

Figure 5:
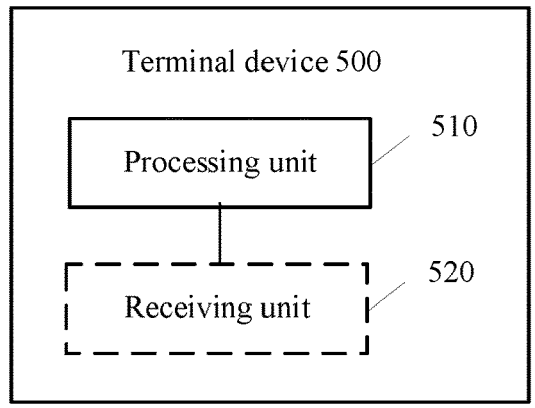
FIG. 5 is a schematic block diagram of a terminal device according to an implementation of the present disclosure.

FIG. 5 is a schematic block diagram of a terminal device 500 according to an implementation of the present disclosure. As shown in FIG. 5, the terminal device 500 includes a processing unit 510, wherein the processing unit 510 is configured as follows.

The processing unit 510 is configured to monitor a PDCCH according to first configuration information indicating a first PDCCH search space for monitoring the PDCCH.

The processing unit 510 is further configured to, perform extra PDCCH monitoring after a first monitoring time point if downlink control information (DCI) is detected by the terminal device at the first monitoring time point in the first PDCCH search space.

In this implementation, the terminal device may perform PDCCH monitoring in the first PDCCH search space, and perform extra PDCCH monitoring in a second PDCCH search space after a time point when DCI is detected. Therefore, the power consumption of the terminal device can be reduced by configuring the first PDCCH search space, and more transmission opportunities can be provided by the second PDCCH search space, to realize timely and rapid scheduling of data packets under the condition of reducing power consumption, thereby ensuring the delay requirement of data transmission.

Optionally, the processing unit 510 is specifically configured to perform the extra PDCCH monitoring according to second configuration information after the first monitoring time point, wherein the second configuration information indicates a second PDCCH search space for performing the extra PDCCH monitoring.

Optionally, the terminal device further includes a receiving unit 520 configured to receive the second configuration information; or, an obtaining unit configured to obtain the second configuration information pre-stored in the terminal device.

Optionally, the receiving unit 520 is specifically configured to receive RRC signaling, a MAC CE or a broadcast message carrying the second configuration information.

Optionally, the second configuration information includes at least one of following pieces of information: an identity (ID) of configuration of the second PDCCH search space, an ID of configuration of CORESET in the second PDCCH search space, a period of a monitoring slot and an offset in the period of the second PDCCH search space, information of symbols for monitoring in a monitoring slot, a monitoring duration in the second PDCCH search space, information of PDCCH candidates in the second PDCCH search space; information indicating whether the second PDCCH search space is a common search space or a terminal device-specific search space.

Optionally, a period of a monitoring slot of the first PDCCH search space is larger than that of the second PDCCH search space; and/or, the number of PDCCH candidates in the first PDCCH search space is less than that in the second PDCCH search space; and/or, the number of PDCCH aggregation levels of the first PDCCH search space is less than the number of candidate PDCCH aggregation levels of the second PDCCH search space; and/or, a monitoring duration in the first PDCCH search space is less than that in the second PDCCH search space; and/or, the number of start symbols for monitoring in a monitoring slot in the first PDCCH search space is less than that in the second PDCCH search space.

Optionally, the processing unit 510 is specifically configured to perform the extra PDCCH monitoring after the first monitoring time point according to a first timer.

Optionally, the processing unit 510 is specifically configured to restart the first timer at the first monitoring time point; and/or restart the first timer every time DCI is detected; and/or continue to run the first timer to enable the first timer to continue running or add 1 to the number of times, recorded by the terminal device, that DCI is not detected if DCI is not detected; and/or stop performing the extra PDCCH monitoring when the first timer expires or the number of times, recorded by the terminal device, that DCI is not detected exceeds a threshold.

Optionally, the terminal device further includes a receiving unit 520 configured to receive configuration information of the first timer; or, an obtaining unit configured to obtain configuration information of the first timer pre-stored in the terminal device.

Optionally, the receiving unit 520 is specifically configured to receive RRC signaling, a MAC CE or a broadcast message carrying the configuration information of the first timer.

Optionally, the terminal device further includes a receiving unit 520, configured to receive indication information for indicating the terminal device to stop the extra PDCCH monitoring. The processing unit 510 is specifically configured to perform the extra PDCCH monitoring after the first time point and when receiving the indication information, stop the extra PDCCH monitoring.

Optionally, the receiving unit 520 is specifically configured to receive DCI carrying the indication information.

Optionally, the terminal device further includes a receiving unit 520 configured to receive the first configuration information.

Optionally, the receiving unit 520 is specifically configured to receive RRC signaling carrying the first configuration information.

It should be understood that the terminal device 500 may perform the corresponding operations performed by the terminal device in the above method 200, which will not be repeated here for brevity.

Figure 6:
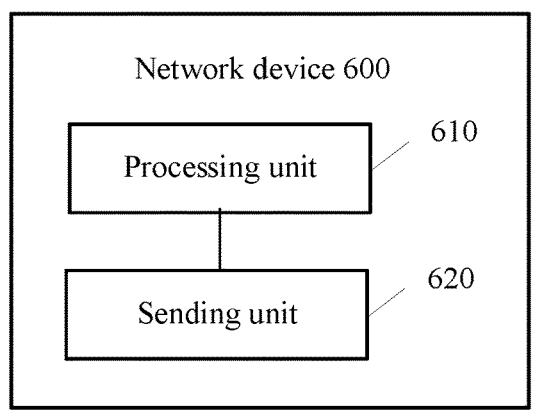
FIG. 6 is a schematic block diagram of a network device according to an implementation of the present disclosure.

FIG. 6 is a schematic block diagram of a network device 600 according to an implementation of the present disclosure. As shown in FIG. 6, the network device 600 includes a processing unit 610 and a sending unit 620.

The processing unit 610 is configured to generate second configuration information indicating a second PDCCH search space for a terminal device to perform extra PDCCH monitoring, wherein the extra PDCCH monitoring is performed by the terminal device after a first monitoring time point, and the first monitoring time point is a time point when downlink control information (DCI) is detected by the terminal device in the first PDCCH search space.

The sending unit 620 is configured to send the second configuration information.

In this implementation, the network device sends second configuration information indicating the second PDCCH search space to the terminal device, so that the terminal device can perform PDCCH monitoring in the first PDCCH search space and perform extra PDCCH monitoring in the second PDCCH search space after a time point when DCI is detected. Therefore, the power consumption of the terminal device can be reduced by configuring the first PDCCH search space, and more transmission opportunities can be provided by the second PDCCH search space, to realize timely and rapid scheduling of data packets under the condition of reducing power consumption, thereby ensuring the delay requirement of data transmission.

Optionally, the sending unit 620 is specifically configured to send RRC signaling or a MAC CE carrying the second configuration information.

Optionally, the second configuration information includes at least one of following pieces of information: an identity (ID) of configuration of the second PDCCH search space, an ID of configuration of a control resource set (CORESET) in the second PDCCH search space, a period of a monitoring slot and an offset in the period of the second PDCCH search space, information of symbols for monitoring in a monitoring slot, a monitoring duration in the second PDCCH search space, information of PDCCH candidates in the second PDCCH search space; information indicating whether the second PDCCH search space is a common search space or a terminal device-specific search space.

Optionally, a period of a monitoring slot of the first PDCCH search space is larger than that of the second PDCCH search space; and/or the number of PDCCH candidates in the first PDCCH search space is less than that in the second PDCCH search space; and/or the number of PDCCH aggregation levels of the first PDCCH search space is less than the number of candidate PDCCH aggregation levels of the second PDCCH search space; and/or, a monitoring duration in the first PDCCH search space is less than that in the second PDCCH search space; and/or, the number of start symbols for monitoring in a monitoring slot in the first PDCCH search space is less than that in the second PDCCH search space.

Optionally, the sending unit 620 is further configured to send configuration information of a first timer, wherein the first timer is used for performing the extra PDCCH monitoring after the first monitoring time point.

Optionally, the sending unit 620 is specifically configured to send RRC signaling or a MAC CE carrying the configuration information of the first timer.

Optionally, the sending unit 620 is further configured to send indication information for indicating to stop the extra PDCCH monitoring.

Optionally, the sending unit 620 is specifically configured to send DCI carrying the indication information.

Optionally, the sending unit 620 is further configured to send first configuration information to the terminal device, wherein the first configuration information indicates the first PDCCH search space for monitoring the PDCCH.

Optionally, the sending unit 620 is specifically configured to send RRC signaling carrying the first configuration information.

It should be understood that the network device 600 may perform the corresponding operations performed by the network device in the above method 400, which will not be repeated here for brevity.

Figure 7:
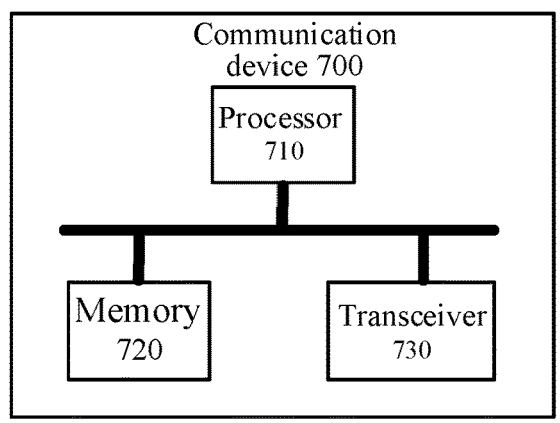
FIG. 7 is a schematic diagram of structure of a communication device according to an implementation of the present disclosure.

FIG. 7 is a schematic diagram of structure of a communication device 700 according to an implementation of the present disclosure. The communication device 700 shown in FIG. 7 includes a processor 710. The processor 710 may call and run a computer program from a memory to implement the method in the implementation of the present disclosure.

Optionally, as shown in FIG. 7, the communication device 700 may further include a memory 720. The processor 710 may call and run a computer program from the memory 720 to implement the method in the implementation of the present disclosure.

The memory 720 may be a separate device independent of the processor 710 or may be integrated in the processor 710.

Optionally, as shown in FIG. 7, the communication device 700 may further include a transceiver 730, and the processor 710 may control the transceiver 730 to communicate with other devices. Specifically, the transceiver 730 may send information or data to other devices or receive information or data sent by other devices.

The transceiver 730 may include a transmitter and a receiver. The transceiver 730 may further include antennas, and the number of antennas may be one or more.

Optionally, the communication device 700 may be specifically a terminal device of the implementation of the present disclosure, and the communication device 700 may implement the corresponding processes implemented by the terminal device in the various methods of the implementations of the present disclosure, which will not be repeated here for brevity.

Optionally, the communication device 700 may be a network device of the implementation of the present disclosure, and the communication device 700 may implement the corresponding processes implemented by the network device in various methods of the implementations of the present disclosure, which will not be repeated here for brevity.

Figure 8:
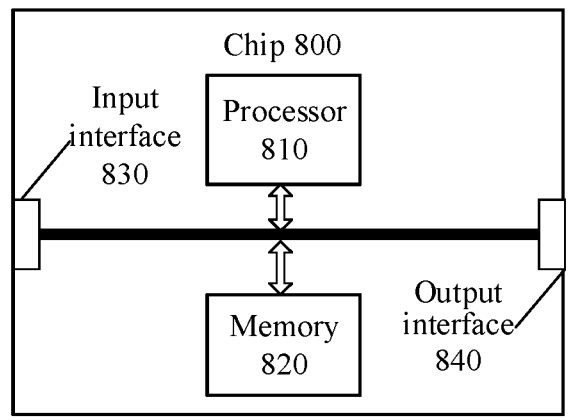
FIG. 8 is a schematic diagram of structure of a chip according to an implementation of the present disclosure.

FIG. 8 is a schematic diagram of structure of a chip according to an implementation of the present disclosure. The chip 800 shown in FIG. 8 includes a processor 810. The processor 810 may call and run a computer program from a memory to implement the method in the implementation of the present disclosure.

Optionally, as shown in FIG. 8, the chip 800 may further include a memory 820. The processor 810 may call and run a computer program from the memory 820 to implement the method in the implementation of the present disclosure.

The memory 820 may be a separate device independent of the processor 810 or may be integrated in the processor 810.

Optionally, the chip 800 may further include an input interface 830. The processor 810 may control the input interface 830 to communicate with other devices or chips. Specifically, the processor 810 may obtain information or data sent by other devices or chips.

Optionally, the chip 800 may further include an output interface 840. The processor 810 may control the output interface 840 to communicate with other devices or chips.

Specifically, the processor 810 may output information or data to other devices or chips.

Optionally, the chip may be applied in the terminal device of the implementation of the present disclosure, and the chip may implement the corresponding processes implemented by the terminal device in the various methods of the implementations of the present disclosure, which will not be repeated here for brevity.

Optionally, the chip may be applied in the network device of the implementation of the present disclosure, and the chip may implement the corresponding processes implemented by the network device in various methods of the implementations of the present disclosure, which will not be repeated here for brevity.

It should be understood that the chip mentioned in the implementation of the present disclosure may be referred to as a system-level chip, a system chip, a chip system or a system-on-chip chip, etc.

It should be understood that, the processor in the implementation of the present disclosure may be an integrated circuit chip having a signal processing capability. In an implementation process, the acts of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor can implement or perform methods, acts and logical block diagrams disclosed in the implementations of the present disclosure. The general purpose processor may be a microprocessor, or the processor may be any conventional processor or the like. The acts of the method disclosed with reference to the implementation of the present disclosure may be directly implemented by a hardware decoding processor, or may be implemented by a combination of hardware in the decoding processor and software modules. The software modules may be located in a mature storage medium in the art, such as a random access memory, a flash memory, a read-only memory, a programmable read-only memory or an electrically erasable programmable memory, or a register. The storage medium is located in a memory, and the processor reads the information in the memory and completes the acts of the above method in combination with its hardware.

It can be understood that, the memory in this implementation of the present disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DR RAM). It should be noted that the memory in the systems and methods described in this specification is intended to include but not limited to these and any other suitable type of memories.

It should be understood that, the foregoing memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, the memory in the implementations of the present disclosure is intended to include, but not limited to, these and any other suitable type of memories.

Figure 9:
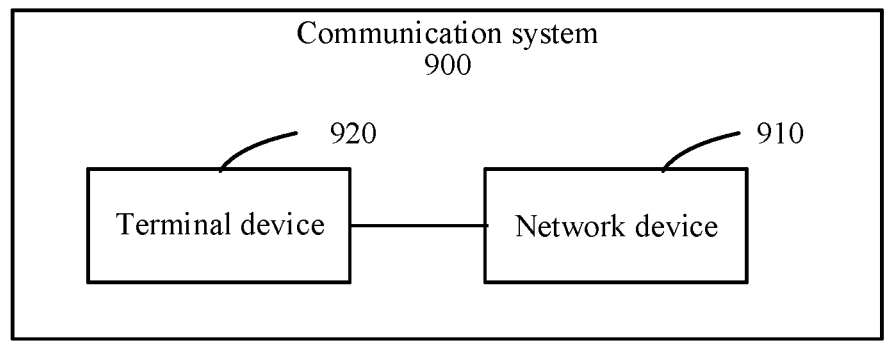
FIG. 9 is a schematic block diagram of a communication system according to an implementation of the present disclosure.

FIG. 9 is a schematic block diagram of a communication system 900 according to an implementation of the present disclosure. As shown in FIG. 9, the communication system 900 includes a network device 910 and a terminal device 920.

The terminal device 920 is configured to monitor a PDCCH by the terminal device according to first configuration information indicating a first PDCCH search space for monitoring the PDCCH, and perform extra PDCCH monitoring after a first monitoring time point by the terminal device if downlink control information (DCI) is detected by the terminal device at the first monitoring time point in the first PDCCH search space.

The network device 910 is configured to send, by the network device, second configuration information indicating a second PDCCH search space for the terminal device to perform extra PDCCH monitoring, wherein the extra PDCCH monitoring is performed by the terminal device after a first monitoring time point, and the first monitoring time point is a time point when downlink control information (DCI) is detected by the terminal device in the first PDCCH search space.

The terminal device 920 may be configured to implement the corresponding functions implemented by the terminal device in the above method 200, and the composition of the terminal device 920 may be as shown in the terminal device 500 in FIG. 5, which will not be described here for brevity.

The network device 910 may be configured to implement the corresponding functions implemented by the network device in the above method 400, and the composition of the network device 910 may be as shown in the network device 600 in FIG. 6, which is not described here for brevity.

An implementation of the present disclosure further provides a computer readable storage medium configured to store a computer program. Optionally, the computer readable storage medium may be applied in a network device of the implementation of the present disclosure, and the computer program enables the computer to perform the corresponding processes implemented by the network device in various methods of the implementations of the present disclosure, which is not described here for brevity. Optionally, the computer readable storage medium may be applied in a terminal device of the implementation of the present disclosure, and the computer program enables the computer to perform the corresponding processes implemented by the terminal device in various methods of the implementations of the present disclosure, which is not described here for brevity.

An implementation of the present disclosure further provides a computer program product including computer program instructions. Optionally, the computer program product may be applied in a network device of the implementation of the present disclosure, and the computer program instructions enable the computer to perform the corresponding processes implemented by the network device in various methods of the implementations of the present disclosure, which is not described here for brevity. Optionally, the computer program product may be applied in a terminal device of the implementation of the present disclosure, and the computer program instructions enable the computer to perform the corresponding processes implemented by the terminal device in various methods according to the implementations of the present disclosure, which is not described here for brevity.

An implementation of the present disclosure further provides a computer program. Optionally, the computer program may be applied in a network device of the implementation of the present disclosure. When the computer program is run on the computer, the computer program enables the computer to perform the corresponding processes implemented by the network device in various methods of the implementations of the present disclosure, which is not described here for brevity. Optionally, the computer program may be applied in a terminal device of the implementation of the present disclosure. When the computer program is run on the computer, the computer program enables the computer to perform the corresponding processes implemented by the terminal device in various methods of the implementations of the present disclosure, which is not described here for brevity.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

It should be understood that in the implementation of the present disclosure, "B corresponding (in correspondence) to A" means that B is associated with A, and B may be determined according to A. However, it should be further understood that determining B according to A does not mean B is determined according to A only, but B may be determined according to A and/or other information.

Those of ordinary skill in the art will recognize that the exemplary units and algorithm acts described in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described repeatedly here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the solution of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the methods described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subjected to the protection scope of the claims.

What we claim is:

1. A method for monitoring a physical downlink control channel (PDCCH), comprising:
   monitoring, by a terminal device, the PDCCH according to first configuration information, wherein the first configuration information is used for indicating a first PDCCH search space for monitoring the PDCCH; and
   performing, by the terminal device, extra PDCCH monitoring according to second configuration information after a first monitoring time point if downlink control information (DCI) is detected by the terminal device at the first monitoring time point in the first PDCCH search space; wherein the second configuration information is used for indicating a second PDCCH search space for performing the extra PDCCH monitoring;
   wherein the method further comprises:

receiving, by the terminal device, radio resource control (RRC) signaling, a medium access control control element (MAC CE) or a broadcast message, carrying the second configuration information.

2. The method of claim 1, wherein performing, by the terminal device, the extra PDCCH monitoring after the first monitoring time point, comprises:

performing, by the terminal device, the extra PDCCH monitoring after the first monitoring time point according to a first timer.

3. The method of claim 2, further comprising:
receiving, by the terminal device, configuration information of the first timer; or,
obtaining, by the terminal device, configuration information of the first timer pre-stored in the terminal device, wherein receiving, by the terminal device, the configuration information of the first timer sent by a network device, comprises:
receiving, by the terminal device, radio resource control (RRC)signaling, a medium access control control element (MAC CE) or a broadcast message, carrying the configuration information of the first timer.

4. A method for monitoring a physical downlink control channel (PDCCH), comprising:
sending, by a network device, first configuration information to a terminal device, wherein the first configuration information indicates a first PDCCH search space for monitoring the PDCCH,
sending, by the network device, second configuration information, wherein the second configuration information is used for indicating a second PDCCH search space for a terminal device to perform extra PDCCH monitoring, wherein the extra PDCCH monitoring is performed by the terminal device after a first monitoring time point, and the first monitoring time point is a time point when downlink control information (DCI) is detected by the terminal device in a first PDCCH search space,
wherein sending, by the network device, the second configuration information, comprises:
sending, by the network device, radio resource control (RRC) signaling or a medium access control control element (MAC CE) carrying the second configuration information.

5. A terminal device, comprising: a processor and a transceiver, wherein
the processor is configured to monitor a physical downlink control channel (PDCCH) according to first configuration information, wherein the first configuration information is used for indicating a first PDCCH search space for monitoring the PDCCH;
wherein the processor is further configured to, perform extra PDCCH monitoring according to second configuration information after a first monitoring time point if downlink control information (DCI) is detected by the terminal device at the first monitoring time point in the first PDCCH search space; wherein the second configuration information is used for indicating a second PDCCH search space for performing the extra PDCCH monitoring; wherein the transceiver is further configured to:
receive radio resource control (RRC) signaling, a medium access control control element (MAC CE) or a broadcast message, carrying the second configuration information.

6. A network device, comprising: a processor and a transceiver, wherein
the processor is configured to generate first and second configuration information, wherein the first configuration information indicates the first PDCCH search space for monitoring first PDCCH, and the second configuration information is used for indicating a second PDCCH search space for a terminal device to perform extra PDCCH monitoring, wherein the extra PDCCH monitoring is performed by the terminal device after a first monitoring time point, and the first monitoring time point is a time point when downlink control information (DCI) is detected by the terminal device in a first PDCCH search space;
the transceiver is configured to send the second configuration information,
wherein the transceiver is further configured to:
send radio resource control (RRC) signaling or a medium access control control element (MAC CE) carrying the second configuration information.

7. The method of claim 2, wherein performing, by the terminal device, the extra PDCCH monitoring after the first monitoring time point according to a first timer, comprises:
stopping, by the terminal device, performing the extra PDCCH monitoring when the first timer expires or the number of times, recorded by the terminal device, that the DCI is not detected by the terminal device, exceeds a threshold.

8. The method of claim 7, wherein after stopping, by the terminal device, performing the extra PDCCH monitoring, the method further comprises:
continuing, by the terminal device, to perform monitoring PDCCH in the first PDCCH search space.

9. The method of claim 8, further comprising:
restarting, by the terminal device, the first timer when DCI is detected by the terminal device; and/or
continuing, by the terminal device, running the first timer, that the DCI is not detected by the terminal device.

10. The method of claim 2, wherein the first timer is started at the first monitoring time point.

11. The terminal device of claim 5, wherein the processor is specifically configured to:
perform the extra PDCCH monitoring after the first monitoring time point according to a first timer.

12. The terminal device of claim 11, wherein the processor is specifically configured to:
stop performing the extra PDCCH monitoring when the first timer expires or the number of times, recorded by the terminal device, that the DCI is not detected by the terminal device, exceeds a threshold.

13. The terminal device of claim 12, wherein after the processor is configured to stop performing the extra PDCCH monitoring, the processor is specifically configured to:
continue to perform monitoring PDCCH in the first PDCCH search space.

14. The terminal device of claim 12, wherein the processor is further configured to:
restart the first timer when DCI is detected by the terminal device; and/or
continue to run the first timer that the DCI is not detected by the terminal device.

15. The terminal device of claim 12, wherein the first timer is started at the first monitoring time point.

* * * * *